(12) United States Patent
Snaper

(10) Patent No.: US 6,536,133 B1
(45) Date of Patent: Mar. 25, 2003

(54) METHOD AND APPARATUS FOR DRYING HARVESTED CROPS PRIOR TO STORAGE

(76) Inventor: Alvin A. Snaper, 2800 Cameo Cir., Las Vegas, NV (US) 89107

( * ) Notice: Subject to any disclaimer, the term of this patent is extended or adjusted under 35 U.S.C. 154(b) by 0 days.

(21) Appl. No.: 09/949,442

(22) Filed: Sep. 7, 2001

(51) Int. Cl.[7] .............................. F26B 3/34; H05B 6/64
(52) U.S. Cl. .......................... 34/265; 34/373; 34/580; 34/218; 422/21; 422/22; 219/698; 219/730; 219/759
(58) Field of Search .......................... 34/255, 256, 259, 34/265, 363, 373, 580, 201, 218; 422/21, 22; 19/0.27, 66 R; 219/690, 698, 700, 730, 759

(56) References Cited

U.S. PATENT DOCUMENTS

| | | | | |
|---|---|---|---|---|
| 4,332,091 A | * | 6/1982 | Bensussan et al. | ........... 34/265 |
| 4,430,806 A | * | 2/1984 | Hopkins | ....................... 34/259 |
| 4,622,757 A | * | 11/1986 | Bernstein et al. | ............. 34/259 |
| 4,934,385 A | * | 6/1990 | Wochnowski | ................ 131/290 |
| 5,105,563 A | * | 4/1992 | Fingerson et al. | ............. 34/203 |
| 5,869,817 A | * | 2/1999 | Zietlow et al. | ............. 219/696 |
| 6,454,996 B1 | * | 9/2002 | Lin et al. | ....................... 422/26 |

* cited by examiner

Primary Examiner—Pamela Wilson
(74) Attorney, Agent, or Firm—Donald D. Mon

(57) ABSTRACT

Reduction of moisture in harvested crop particles. Waste heat from an internal engine carried by a harvester is applied to the crop during the harvesting process. Microwave energy is applied to the crop, concurrently with application of the heat, or separately from it. The objective is to reduce the moisture to a level acceptable to a storage facility, or at least to reduce the cost of further reduction.

17 Claims, 3 Drawing Sheets

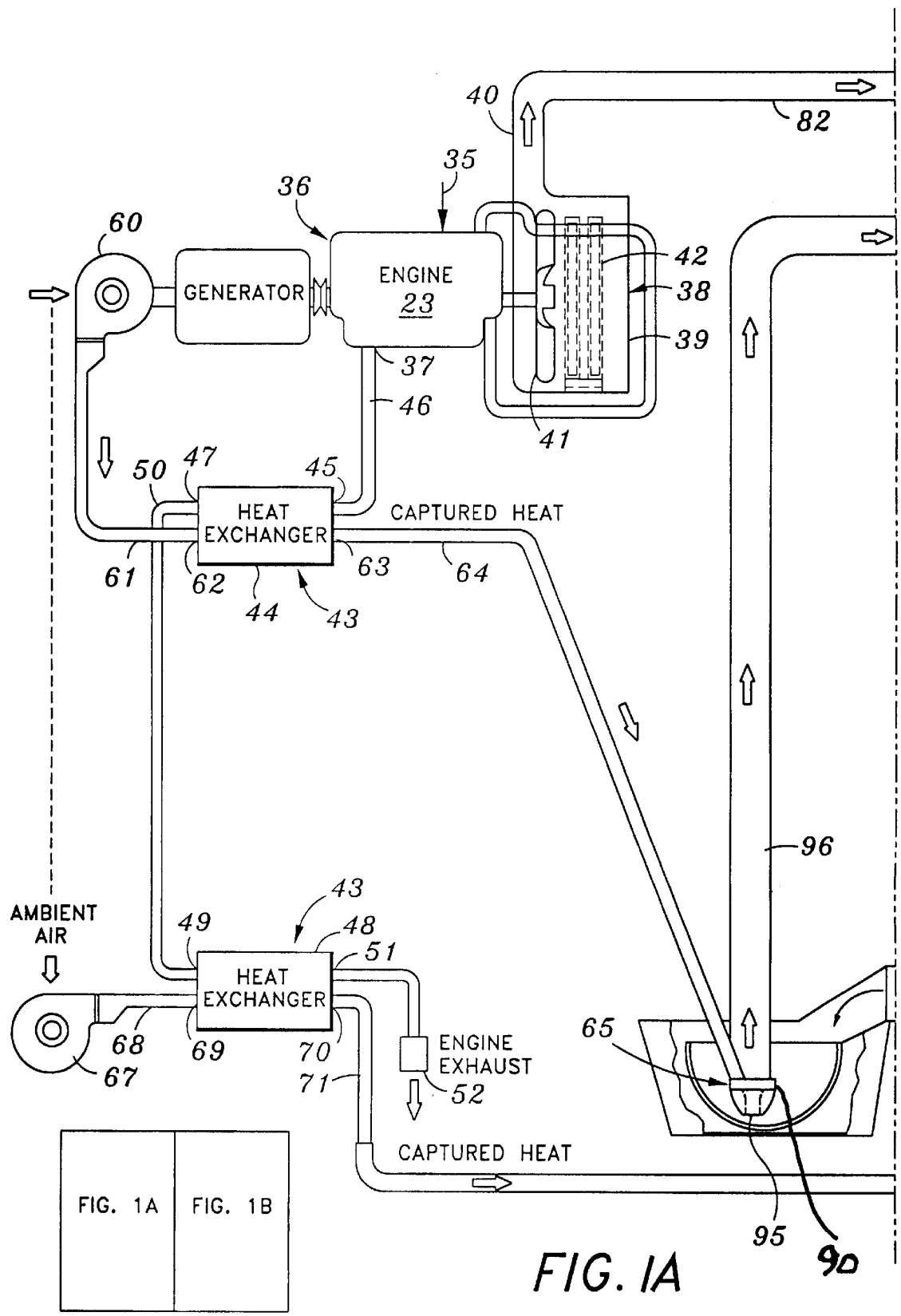

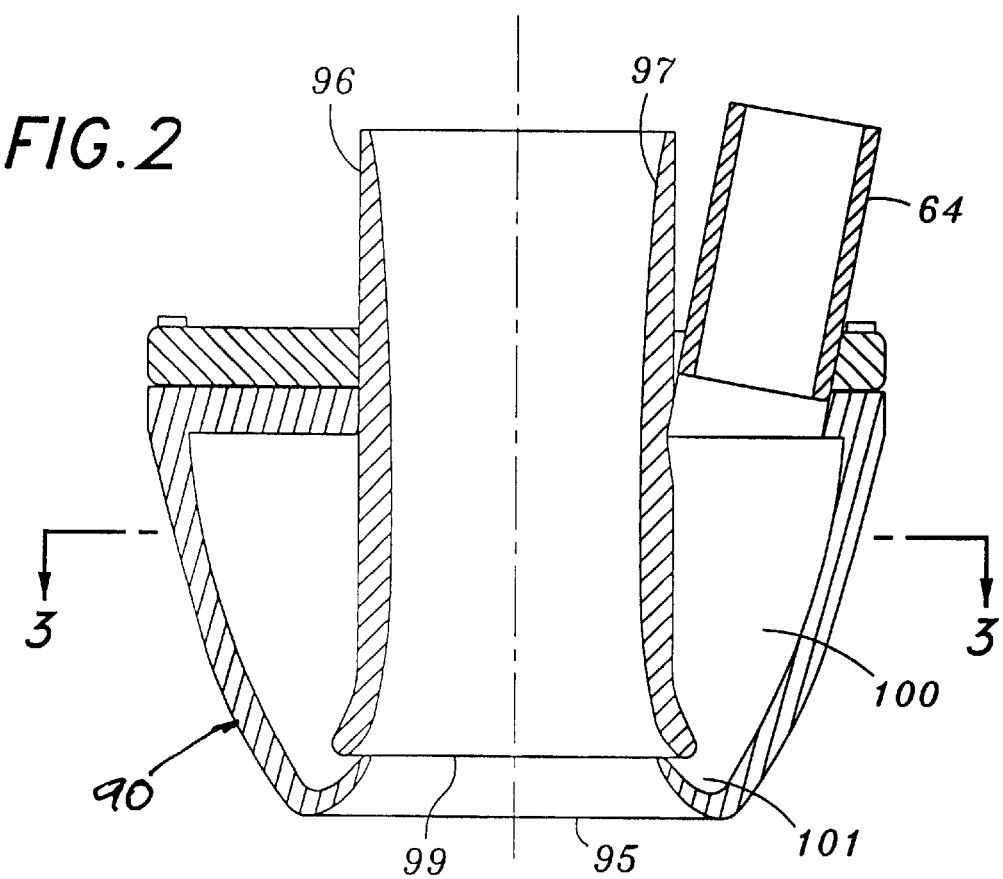
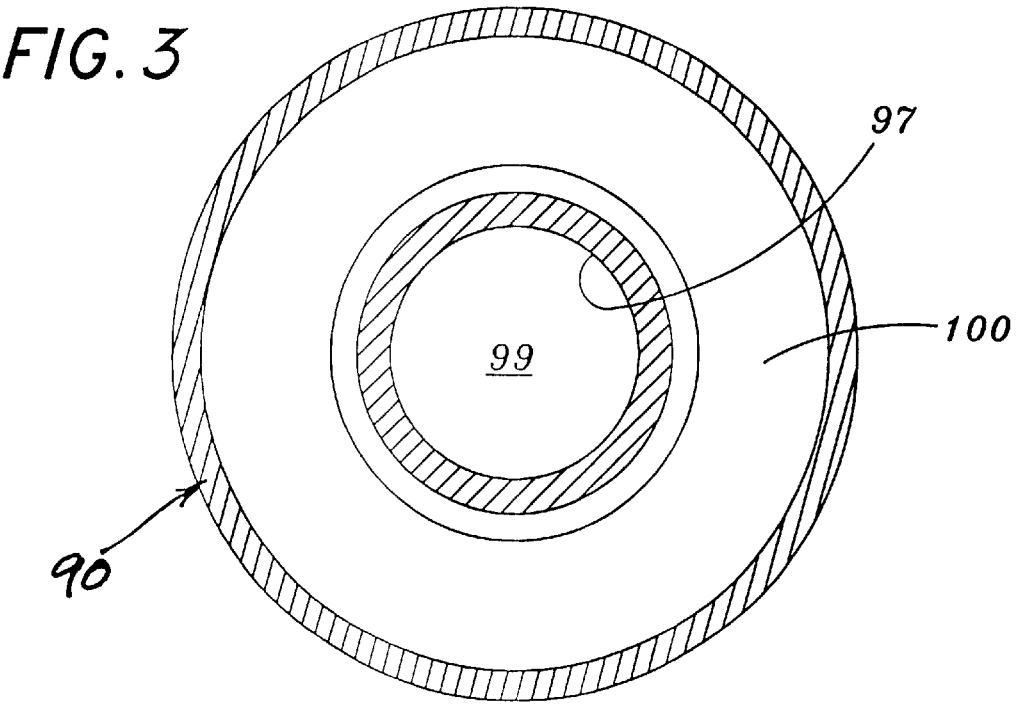

METHOD AND APPARATUS FOR DRYING HARVESTED CROPS PRIOR TO STORAGE

FIELD OF THE INVENTION

Reducing moisture on and in harvested crops prior to their storage.

BACKGROUND OF THE INVENTION

The harvesting and storage of crops, and especially the storage of crops for a substantial period of time, is heavily affected by moisture of the atmosphere and of the moisture within the collected crop itself. Crops are harvested while under widely varying atmospheric conditions. Heavy dew, recent rain, and drought are examples of circumstances faced by harvesters of field crops due to atmospheric conditions. In addition, the moisture content in the particles of crop, for example inside the outer membrane of a grain of corn, count as part of the moisture of concern. The subsequent storage of a crop in structures such as elevators and silos is highly sensitive to moisture content from any source, and these structures can tolerate moisture levels only below certain threshold values relating to integrity of the crop and of the structure itself.

For example, when corn is to be stored after harvest, it is common practice for an elevator to refuse to store grain with a total moisture content greater than 14%. Of course a crop which is brought to the elevator might have a moisture content higher or lower than that, but if it is higher, the elevator proprietor will either refuse to store it, or will levy a surcharge to pay for him to reduce the moisture content to an acceptable level. This is a substantial surcharge which the farmer will much prefer to avoid. Furthermore, the reduction of moisture is generally done with heated air, whose heat is derived from a propane flame. The cost for this process is a function of how much moisture needs to be removed, and of course on the current unit price of propane. In whatever event, the requirement for heat involves an uncertain expense that cannot be predicted, and also involves release of carbon compounds into the atmosphere that is subject to regulation which is certain to become even more stringent.

It should be remembered that it is not the object of the invention to "dry" the crop in the sense of desiccation. Crops with moisture are regularly and routinely stored. The function of this invention is to bring down the moisture level to or toward an acceptable level by affordable means.

Increased fuel cost and environmental adversity are not the only objectionable complications of moisture content in the crop. The unavoidable additional physical handling of the crop required by the moisture-removing process can lead to degradation of the physical characteristics of the crop itself, such as by causing bruising, scratching and fragmentation of the product. This invention minimizes those risks.

It is an object of this invention to utilize the combination of two moisture-reducing techniques which, when used together result in a surprising reduction of moisture compared to the comparable use of one of them alone, or each separately.

In addition, and as an optional objective, use can be made in the field, on the harvester itself, of an inherent source of heat which in current practice is wasted to the atmosphere, or at best a very small amount is directed to heating the operator's cabin. By heat-treating the crop with waste heat from the engine while the crop is being harvested, the requirement for a later moisture reduction can be significantly reduced, and sometimes eliminated entirely. This also can reduce the handling of the crop.

This invention thereby provides a means to improve a harvested crop not only just before storage, but if desired also while it is being harvested, so that with less handling and less fuel cost, the crop can be made ready for storage.

BRIEF DESCRIPTION OF THE INVENTION

In this specification, the harvesting and treatment of corn is provided as an example for illustration purposes. The invention is applicable also to any other crop that can be stored in elevators or silos. Examples of other crops with which this invention is useful are soybeans, wheat and rye.

According to this invention, the harvested crop, for example shelled corn, is heated to reduce its moisture should existing moisture of the crop as harvested in the field exceed levels acceptable for storage. The heat can be provided in two forms: first, a heated airstream flowing over and through the crop, and second, microwave energies injected into the crop at frequencies which are utilized to vaporize water. Such frequencies are commonly utilized in microwave ovens.

The heating effect of these frequencies resides in the vaporization of water in the product to be heated. While these frequencies are effective for removing surface moisture, their greater value in this invention is for vaporizing water inside the particles of product themselves. This energy can be applied independently of a heated airstream.

According to a preferred but optional feature of the apparatus and method, the apparatus is mounted to or towed along with a harvester while it is harvesting the crop. Exhaust heat from the harvester engine is utilized to heat an airstream which flows over, into, and through the crop as one step in drying the crop. Conventionally this engine heat is wasted to the atmosphere by cooling the radiator or in the exhaust gases from the engine. In this embodiment, engine heat developed in excess of motive requirements is not wasted. Rather it is used beneficially. If desired, an auxiliary source of heat, even a burner can be used along with it, or separately, or a somewhat larger engine than is needed for propulsion and operation of the harvesting machinery may be installed.

Energy in the two forms is preferably applied simultaneously, so the flowing heated airstream can assist in removing vaporized water which has passed from the inside of the particle to the outside of it, and can be carried away in the airstream, along with such water as existed on the surface of the crop when the crop was harvested.

Advantages are provided by exerting the microwave energy at least some of the time while engine heat is also being applied. It is best practice to start both of them as soon as possible, preferably in the field. Preheating the crop with hot gas before treating it with microwave energy also provides advantages.

As a consequence of any of the available arrangements, the farmer himself is enabled to reduce the moisture in the crop with least damage to the crop, and without any surcharge (or at least only with a reduced surcharge) to be paid at the elevator. The potential savings are in fact quite large, and go straight to the farmer's bottom line. Again it is emphasized that the objective is to reduce moisture to an acceptable level, rather than to "dry" the crop.

It is an additional preferred but optional feature of the invention to reduce physical wear on the crop as it is being handled, by utilizing a fluidics system for moving the harvested crop instead of using the mechanical rotary-type augers or buckets that are conventionally used to propel the crop in a harvester system beyond the thresher head.

The above and other features of this invention will be fully understood from the following detailed description and the accompanying drawings, in which:

BRIEF DESCRIPTION OF THE DRAWINGS

FIGS. 1A and 1B are edge to edge schematic showings of the system according to this invention;

FIG. 2 is a cross-section of a portion of a fluidic lift showed in FIG. 1; and

FIG. 3 is a cross-section taken at line 3—3 in FIG. 2.

DETAILED DESCRIPTION OF THE INVENTION

Figure 1B:
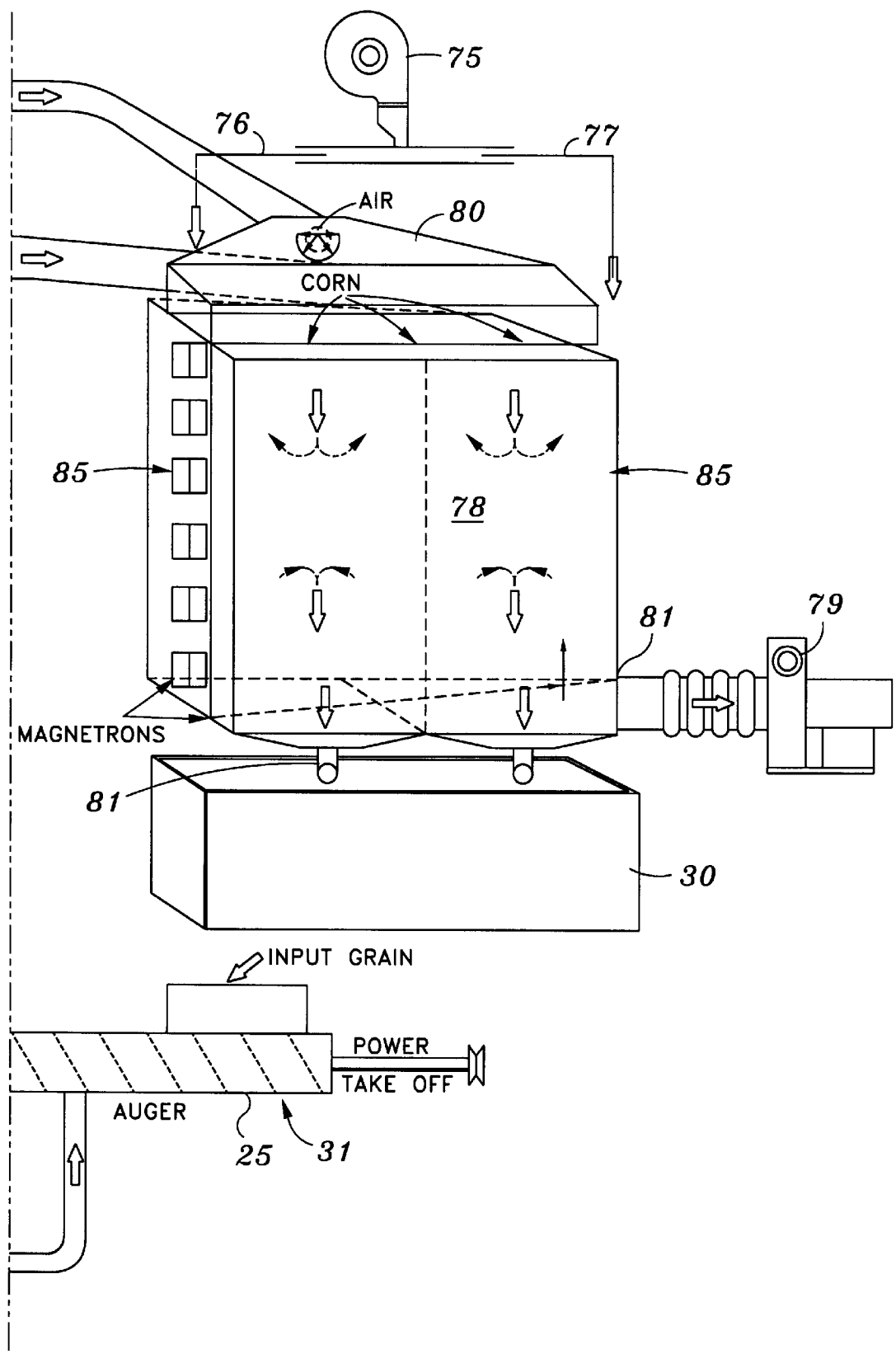

A detailed description of a harvester construction (frequently called a "combine") is not necessary for an understanding of this invention. In fact, this invention is intended to be an accessory to a standard combine.

A typical combine has a chassis equipped with tires, transmission and propulsion devices such as an internal combustion engine supported on wheels driven by an internal combustion engine 23 through a conventional transmission. Engine 23 characteristically produces a stream of hot exhaust gases from its combustion cylinders, and its coolant system produces heat that is usually dissipated to the atmosphere by its radiator. Both provide a stream of heated air. The specific relationship of the combine to this invention is its capacity to carry or tow the harvested crop, and to provide from its engine a source of heat useful for the reduction of moisture in the crop. The two sources of heated air are the engine coolant and the engine exhaust gases.

The exhaust gases are not intended to be applied to the crop itself because of their pollutant load. There can be no direct contact with the crop. Instead, heat exchangers are provided which extract the heat from both of these sources. A typical engine radiator is a suitable device for the liquid/gas transfer of engine heat to an incoming ambient airstream. Any suitable gas/gas heat exchanger can be utilized to exchange heat from the exhaust gases to an incoming ambient airstream.

The intended destination of the heated airstream from either of these sources is arbitrary and will often be decided by convenience of location of the source and destination. Therefore this invention is not to be limited by the particular arrangements shown herein, but it does show a preferred arrangement for at least one very popular combine.

The details of a harvesting head are of no importance to this invention. The cutting devices themselves are not shown in the drawings. The harvested crop to be stored, for example shelled corn, are collected by a lateral auger 25, which is a helically-surfaced rotating body that conveys the harvested crop to a receptacle. This invention begins after this auger, as will later become apparent.

Internal combustion engine 23 constitutes the power source for this entire system, as well as for propelling the combine and for operating its crop-cutting and gathering equipment. Requirements can vary from crop type to crop type and from one size to another of combine and its accessories.

A crop bin 30 is mounted to the chassis at its side. If desired, the bin can instead be mounted on a towed vehicle carried at the side of or behind the chassis, as preferred.

A harvesting head is mounted to the front of the chassis. It has a width sufficient to harvest a suitable number of rows of crops, or a width of path when the crops are not in rows. Such heads have means to gather and guide the crop to cutters, and threshers to separate the ultimate crop value from its burden such as stalks, stems, and cobs. Its output is supplied to the auger.

The value output of the harvester is the crop to be stored. The moisture of the harvested crop is the concern of this invention.

Engine 23 is schematically illustrated with an air inlet 35, a fuel inlet 36, an exhaust gas outlet 37, and a heat exchanger 38. Heat exchanger 38 has an ambient air intake 39, and a heated air outlet 40. A blower 41, perhaps a radiator fan, moves air through the heat exchanger to be heated for use with this invention.

Heat exchanger 38 captures heat generated by the engine which is conveyed to exchanger 38 by engine coolant through grid 42. Part of the heat exchanger will be recognized as the radiator (or part of a radiator) conventionally provided with an internal combustion engine. Heated air exits from the exchanger 38 through heated air outlet 40.

Exhaust heat exchanger 43 is most conveniently formed in two segments joined in series. It will be recognized that a different plumbing arrangement can be provided instead.

First segment 44 has an exhaust gas inlet 45 which receives exhaust gas from the engine through conduit 46. An exhaust gas outlet 47 is connected to the exhaust gas inlet 49 of second segment 48 by conduit 50. The exhaust gas outlet 51 of second segment 48 connects to an exhaust control device 52 such as a muffler, which in turn discharges to atmosphere.

A blower 60 provides ambient air under pressure through conduit 61 to the air inlet 62 of first segment 44. Air heated in the first segment exits through heated air outlet 63 to a conduit 64 which in turn is connected to a fluidic pump 65.

A blower 67 provides ambient air under pressure through conduit 68 to the air inlet 69 of second segment 48. Air heated in the second segment exits through heated air outlet 70 through a conduit 71 which in turn is connected to auger 25 for the optional purpose of pre-heating the crop to be treated in this system.

A third blower 75 supplies coolant air through conduits 76, and 77 for cooling magnetrons yet to be described. An exhaust blower 79 withdraws air from treatment chamber 78 through a vent port 81.

The foregoing description relates to circulation of air through the system, and the capture of heat from the engine coolant and from the engine exhaust gases. The circulation of the crop through the system from the harvester head will now be described.

Treatment chamber 78 is preferably mounted to the chassis. For adaption to modern harvesters, it is convenient for the crop to pass through the chamber vertically downward. Generally it will be preferable for the chamber to have two opposed space-apart parallel walls joined together at their sides, tops and bottoms. Full details of construction will be provided below. For present purposes, it is sufficient to disclose a heated air inlet 80 and vent port 81 into and from the chamber to allow for injection of heated air from fan 41 through conduit 82 into the chamber, and venting of the air from the chamber through vent port 81, thereby to provide a flow of heated air through the crop as it flows downwardly through the treatment chamber. The heated air flow may be counter-current if preferred.

A microwave source 85, for example two groups of magnetrons, is disposed adjacent to the treatment chamber.

Only one group is shown in the drawings. The other group is on the other side of the treatment chamber directed into the treatment chamber. Their radiation is directed into the crop inside the chamber. They do not directly contact the crop. Ambient air from blower 75 flows over the magnetrons, from conduits 76 and 77 to cool the magnetrons.

A fluidic lift 90 lifts the crop from the thresher to the treatment chamber and discharges the crop into it.

As will later be described, the lifts are pneumatic, of a type characterized as "fluidic". This class of flow is surprisingly effective for conveying particulate material such as shelled corn with minimal physical abrasion and with least energy needed to transport it.

At this point, a few comments about the nature of the crop, the moisture-reducing process, and fluidics will assist in an understanding of the invention.

Moisture content in the sense in which the term is used in this art relates to water inside the crop particles and on the outside of the crop particles in all conditions of handling and storage. Water on the surface of a wet crop is readily understood. However, there appear to be other ways in which water is contained within the particulate material which forms the crop, and which are measured by persons who store the crop. An example is kennels of corn. Here it appears that water is bound in various ways in the skin itself, in the cellular material enclosed by the skin, and perhaps between the cells themselves.

In whatever form and condition, the water as it exists in the crop is still measured by a meter such as the hand-held Model 500of Eaton AG Electronics Control Division, Carol Steam, Ill. 60188. This meter operates on a capacitance measurement concept and measures the total gross moisture however it exists. It is generally accepted in the elevator trade for measuring moisture in corn, soy beans, and other grain crops. It is used to determine the surcharge for too-moist crops. For other crops, different measuring means may be needed. The identity of the measuring device is not part of this invention.

It is a fact that heating any crop long enough and at high enough temperatures will dry it out. However, the inventors herein have learned some surprising facts about the drying process. Heated with air for a specific length of time, the moisture will initially be reduced. Left to stand for a number of minutes after the heating is stopped, the moisture percentage will continue to decline to some lower value because the crop is still warm.

In contrast, depending on the intensity of the microwave radiation, heating with microwave radiation alone for the same length of time is not usually as effective in reducing the moisture, either as to immediate reduction of moisture or as to ultimate lower level achieved after a short delay. However, after a substantial repose period, the moisture level will reduce some more.

Surprisingly, heating simultaneously with both modes (heated air and microwave) for the same length of time, may not result in a lesser immediate reduction than when either is used alone. In fact it sometimes is less than when either of them is used alone. However, after the crop rests a while after the heating is stopped, there is an unexpectedly larger ultimate reduction in moisture content, to a level lower than when either was used alone under the same conditions.

The precise reason for this surprising result is not known, or at least is not fully understood. For whatever reason, after a "rest" interval the combination of the two modes provides a significantly enhanced reduction of total moisture. Combined with the use of fluidic transfer techniques, there is much less degradation of cellular structure, cooking of the product, or abrasion.

Extensions of these test results indicate that exertion of both modes together result in reductions which are greater than would be expected from use of either one alone. Use of both modes for a sufficient length of time is to be encouraged. For reasons to be explained, advantages can be attained by later application of an airstream, as well as by pre-heating of the crop.

Reference is made to fluidic lift 90. On a commercial thresher, the thresher head classically has a screw-type auger to move the threshed crop and its burden away from the head and toward the location of further processing or disposal. This portion of a thresher is unavoidably rough on the product, and cannot be avoided. The plant has been cut from its roots, the stems and stalks removed, and in the situation with corn, the head of corn has been husked, and the kernels have been removed from the cob. The cobs are disposed of along with the remainder of the trash. The kernels (shell) have had a rough passage, and it is an object of this invention to make the remainder of the trip to storage as benign as possible.

In a system such as this one, the internal transport of product from location to location can be important. Crops when harvested can be in varying conditions of hardness or firmness, and their manipulation can lead to distortion, fragmentation and disruption if excessive force is applied. However, once these necessary acts are concluded, what remains is the value of the entire operation and it should be handled as gently as is consistent with high-volume, high strength, rapidly moving machines.

The crop is fed by auger 25 to a surge receptacle 65. From this receptacle it is to be conveyed to the treatment chamber through lift 90. The crop will preferably have been preheated while in the auger from the second segment 48 of heat exchanger 43. This can remove significant amounts of surface water from the crop, and can do at least some pre-heating of the crop itself.

The intake end 95 of the first fluidic lift will preferably be below the top level of crop in the receptacle. However, this is not necessary because of the way the lift operates.

The lift is "powered" by heated air from first segment 44 of heat exchanger 43. It is supplied to the lift through conduit 64. Being heated, this air will not only power the lift, but will apply heat to the crop as the crop travels through the shaft 96 of the lift.

As best shown in FIG. 2, this lift does not apply a pneumatic force across the full cross-section of the shaft, Instead, it exerts a strong flow along the inside wall 97 of the shaft at the inlet end. The inlet end has an open central entry port 99, which is surrounded by a ring-like plenum 100 which receives heated air from conduit 64.

Surrounding the inlet end is a re-entrant groove 101 which receives air from the plenum and discharges it in a cylindrical sheet-like pattern along the inside wall 97 of the shaft. Given sufficient volume and rate of flow, this air flow will entrain crop particles at the entry port and convey them through shaft 96 to the intake 80 of treatment chamber 78.

Observation of the flow of particles shows a reduction of tumbling and turbulence of the drop. Fractures and abrasions are remarkably reduced compared to results when screw feeds or the more common types of pneumatic feeds are used. Furthermore, the particles are heated by this propulsive air flow which is especially useful in heating water in the surface of the crop particles.

When the particles reach the inlet port, they will be distributed by a spreader (not shown) to cover the top of the crop already in the chamber. Gravity flow is sufficient. The crop deposited on the top will replace crop removed through the exit port or ports 81 at the bottom. From there the particles will be deposited, perhaps directly in bin 30, or perhaps be moved by another fluidic lift to a distant bin.

Application of surface heat, such as by heated air will remove moisture from a crop. In fact this is what is done at the elevator to reduce moisture in the crop. The ways to accomplish this to a desired extent are either to raise the temperature considerably for a shorter time, or to keep the temperature low for a longer time. For many crops this is akin to cooking them. It should be kept in mind that moisture in the interior of the crop is also measured by the instruments, and that a sufficient temperature must be reached so that there is a gradient tending to move internal moisture out through the skin or other outside membrane. To keep the temperatures within reason when gross external heating is used, the process can be undesirably slow and of long duration, which can affect the crop itself.

According to this invention, the internal moisture is vaporized by microwave radiation. This internal vaporization, which need not heat the entire particle to a very hot temperature, will cause the vapor to move toward and through the outer membrane. Certainly it is faster than heating the particles from the outside. It does not require a higher skin temperature to raise the internal temperature.

For best results, a heated airstream and microwave radiation are simultaneously applied to the crop in the treatment chamber. It is possible to apply these treatments separately, but significant advantages will be lost. For example, when the vapor created in the inside of the particle by the microwave energy reaches the outside of the particle, it is advantageous for it to be swept away by the heated airflow, even while the airflow exerts its own heating effect on the particle.

The flow rate of crop through the treatment chamber is controlled by gates (not shown), at the entry and exit of the chamber, or both. Dampers and diverter valves can be provided to adjust air flow among the various conduits.

Also, heat from the engine radiator can be utilized instead of heat from the exhaust gases, or they can be mixed together.

As to the parameters of the system, the temperature of the airstream arriving at the heater chamber will ordinarily be above 100 degrees F. for shelled corn. The selected temperature may be higher or lower for other crops, but the limits will readily be recognized by agronomists. Generally a temperature of at least 100 degrees F. should be provided. If necessary, supplementary heat may be provided, for example from an on-board propane heater with its own heat exchanger, but this will rarely be necessary.

The microwave radiation is that which is used for ordinary microwave ovens. Such ovens function by vaporizing water. The most useful frequencies are about 900 MHZ and 2.45 GHZ, and can be provided by the emitters in this invention. Their water vaporizing effects are generally known. 900 MHZ is the favored frequency. It is most frequently used for vaporization of water and may be used alone. The 2.45 GHZ frequency is regarded as less efficient, but can be used alone or with the other. These frequencies are effective on all water, inside or outside of the particles.

The beams of frequencies 900 MHZ and 2.45 GHZ of course include other nearby frequencies. Such beams are comprised mostly of these frequencies, with lesser amounts of nearby frequencies, as normally encountered commercially. However, the frequencies content of the beams is primarily of these.

While either frequency can be used alone, surprisingly favorable results can be obtained. The reasons are uncertain, but the results are not. One is entitled to theorize that the beat frequencies of two mixed frequencies may be important. Also, because the beans encounter different surfaces and different materials. They may and will interact with one another in unpredictable ways.

Critical observations of results when either frequency is used alone and when both are used together, clearly show an improvement when they are used together.

There has now been described the framework of the system. Crop is harvested and conditioned by the harvester in a routine manner, producing a particulate product with moisture content which depends on the wetness of the field being harvested, and on the inherent moisture within the crop itself. The inherent moisture varies with the growing conditions and the time when in the maturing cycle the crop was harvested.

The crop is conveyed to the fluidic pump for further processing. Pre-heat can be applied both in the auger and in the fluidic pump to accelerate the drying process. It is best practice to provide the crop to the treatment chamber at an increased temperature, and after the removal of at least some of the external moisture by the heated air.

The crop in the treatment chamber is further treated with microwave energy and preferably also with heated air. From the treatment chamber, the crop is deposited in a bin from which it will ultimately be delivered to an elevator for storage. It may be useful to continue to apply heated air to the crop after the microwave to remove any water which may have continued to leave the crop particle. Heated air supplied to a temporary storage bin is a preferred, post microwave moisture removal technique.

A preferred feature of this invention is its use of heat which otherwise would be wasted, at a time in the process when it can most effectively reduce the moisture. Even in initial storage, when a later reduction at the elevator would still be needed, the storage of a crop, even when in transit is better when the crop is not as wet, and contains less moisture in its particles.

Waste heat from engine coolant and engine exhaust are two sources, which through heat exchangers can be used concurrently or optionally in any part of the system.

As a further advantage, the power to drive the magnetrons can be derived from the engine's generator (alternator), which itself in turn generates heat that is recovered from the engine coolant and engine exhaust. The net fuel requirement for the magnetrons is thereby reduced by the recovery of heat which is heating the crop with a heated airstream.

A separate or larger generator than is usually provided with the harvester may be needed to power the magnetrons.

The economic savings enabled by capture and use of engine heat, while attractive, are not the only, and perhaps not the most important advantages of this invention. Instead, the gentle treatment and prompt removal of moisture at the time of harvest, especially from the inside of the crop particle itself, may be more important.

Because the moisture in crops such as shelled corn can and will change appreciably during harvesting, processing, storage, and even testing, it is difficult to produce accurate comparative test results. However, observations made over a significant period of time and with various parameters, enable one to make some generalized statements which are of importance to this invention.

Treating the crop in the treatment chamber with the use only of heated air or only with microwave energy will reduce the moisture content of the crop by a significant amount. It is interesting to observe that in both situations there is a rather rapid decrease, followed during a rest period afterward by a further smaller decrease. It is apparent that during. the "rest" period, vaporized moisture caused by heating of the crop will continue to leave, but at a relatively low rate.

The processing of crops by a thresher is not a slow one. Rates as high as 25 bushels of shelled corn per minute are known. This process responds favorably to a wide range of processing speeds.

Treating the crop only with microwave, but without heated air (or in some tests without any airflow at all), the moisture will be reduced. Then during a rest period it will reduce further. The reduction will usually stop in less than 45 minutes. Generally the moisture content will be less than if the crop had been treated only with heated air. Treatment, first with heated air, and then with microwave, will result in a reduction of moisture to a level below that of either one applied separately. This is more than merely an increased application of both, and is not merely additive. In fact, its results are uniformly better, but randomly so.

The circumstances are surprisingly favorable if in the treatment chamber both processes are applied simultaneously. Then some unexpected consequences arise. In the treatment chamber there is a continuous flow of heated air across the surfaces of the crop particles. It is tempting to observe that this is the same as heating only with heated air. But it is not the same when microwave energy is simultaneously applied. Then the vaporization of surface water on the particles (including moisture in the outer membranes) is accelerated. The heated air then has a lesser task of vaporizing the water, and a larger task of transporting the vapor away from the particle and out of the treatment chamber.

Even more importantly, the task of the microwave energy is reduced if there is preheat before the particles have reached the treatment chamber. They are warmer to start with, as is the moisture on their surface.

Now the microwave energy can be applied to moisture within the particles inside and in the external membranes, and in the material of the particle itself. This moisture is vaporized, but is still contained inside the external membrane. To escape it must pass through the membrane.

The effect of heated air is to heat the internal structure from the outside, which is rather gradual because it is caused by conduction. To achieve a given elevated temperature in the particle requires a much higher temperature nearer the surface, and this can adversely affect a delicate crop.

With microwave energy the situation is different, because the energy penetrates the particle when applied at an appropriate frequency and intensity. The result is heating throughout, but without requiring that a surface temperature higher than the internal temperature be developed. The result is, in a particle at a potentially lower temperature, all or most of the moisture is vaporized, and all of it is biased toward a lower concentration and temperature outside. There is a positive tendency for the moisture to leave the particle, and within a short period of time. Then, because there is a flow of heated air past the particles, this moisture is not condensed, but instead is carried away by the warm airstream.

There is a marked reduction of moisture to a value less than what is accomplished by either mode (heated air or microwave radiation). Experience has shown that the simultaneous exertion of the two modes is of importance. When used on a harvester, there is only a limited period of time for this process, largely because the volume of the harvested crop is significantly larger than the volume of the treatment chamber. When used along with a harvester, this system must have a commensurate capacity. It is, of course possible to use this system as a pre-treatment in conditions that are so adverse that sufficient reduction of moisture for the elevator can not attained in the field. Then supplementary drying, perhaps at the elevator will be needed.

Still it has been found-that with a sufficient simultaneous application of heated air and microwave energy, followed by a brief rest period, very often a crop which would be refused by an elevator without further treatment will be acceptable without any.

This invention is not to be limited by the embodiments shown in the drawings and described in the description, which are given by way of example and not of limitation, but only in accordance with the scope of the appended claims.

I claim:

1. Apparatus for reducing the moisture content of harvested crops comprising:

a treatment chamber having a path of movement of crop particles therethrough, said chamber having a particle entry port and a particle exit port spaced apart from one another, between which said crop particles pass along a path of particle flow;

a magnetron mounted to said treatment chamber so disposed and arranged as to emit microwave energy into said crop particles and vaporizing at least some of their moisture as the particles flow through the chamber;

a source of heated air, said treatment chamber having a heated air inlet and a heated air outlet spaced apart from one another and so disposed and arranged that heated air from said source flows through said crop particles, warming them as they flow through the chamber and vaporizing water on the particles;

whereby the heated air stream sweeps with it water which has been vaporized by said heated air and also by the microwave energy.

2. Apparatus according to claim 1 in which said apparatus is mounted to a harvester, and receives crop particles as they are being harvested, said treatment chamber exit port discharging said crop particles to a collector.

3. Apparatus for reducing the moisture content of freshly harvested crop particles produced by a harvester which includes a harvester head that produces crop particles while the harvester passes through a crop field, said harvester including a chassis, an internal combustion engine which develops waste heat as it operates, and an air compressor, said apparatus receiving said crop particles from the harvester head, said apparatus comprising:

a treatment chamber having a path of movement of crop particles therethrough, said chamber having a particle entry port and a particle exit port spaced apart from one another, between which said crop particles flow along a path of particle flow;

a magnetron mounted to said treatment chamber so disposed and arranged as to emit microwave energy into said crop particles and vaporize at least some of their moisture as the particles flow through the chamber;

said treatment chamber having a heated air inlet and a heated air outlet spaced apart from one another and so disposed and arranged that heated air will flow through said crop particles, warming them as they flow through the chamber;

a first heat exchanger capturing waste heat from engine coolant;

a second heat exchanger capturing waste heat from engine exhaust gas; said heat exchangers receiving air under pressure from said air compressor to provide streams of heated air, at least one of said streams discharging heated air into the heated air inlet of the treatment chamber;

a fluidic lift accepting crop particles from the harvester head and propelling and conveying them to the particle entry port of the treatment chamber, at least one of said streams of heated air discharging into said fluidic lift to propel the crop particles toward said particle entry port;

whereby heated air in the fluidic lift preheats the crop particles as they pass through the fluidic lift, microwave energy vaporizes water in the crop particles in the treatment chamber, and heated air entering the heated air inlet further warms the crop particles in the treatment chamber and sweeps with it water which has been vaporized by said heated air and also by the microwave energy.

4. Apparatus according to claim 3 in which said treatment chamber and fluidic lift are mounted to said chassis, said treatment chamber particle exit port discharging crop particles to a collector.

5. Apparatus according to claim 4 in which said fluidic lift comprises a cylindrical tube having an open entry end and an open exit end, a plenum surrounding said entry end which receives heated air from one of said streams, a re-entrant lip inside said tube at said entry end, said lip including a flange spaced from the inner wall of said tube and directed away from said entry end, said lip forming a channel which receives heated air from said plenum, whereby to direct a cylindrical stream of heated air into the tubing tending to draw crop particles into said tube and to propel and convey them toward said exit end while also warming the particles, and delivering them to the particle entry port of the treatment chamber.

6. Apparatus according to claim 3 in which a plurality of said magnetrons is mounted to said treatment chamber in a row paralleling said path of movement of said crop particles.

7. Apparatus according to claim 3 in which said treatment chamber and fluidic lift are mounted to said chassis, said treatment chamber particle exit port discharging to a collector.

8. Apparatus according to claim 7 in which said fluidic lift comprises a cylindrical tube having an open entry end and an open exit end, a plenum surrounding said entry end which receives heated air from one of said streams, a re-entrant lip inside said tube at said entry end, said lip including a flange spaced from the inner wall of said tube and directed away from said entry end, said lip forming a channel which receives heated air from said plenum, whereby to direct a cylindrical stream of heated air into the tubing tending to draw crop particles into said tube and to propel and convey them toward said exit end while also warming the particles, and delivering them to the particle entry port of the treatment chamber.

9. Apparatus according to claim 8 in which a plurality of said magnetrons is mounted to said treatment chamber in a row paralleling said path of movement of said crop particles.

10. A fluidic lift for propelling and conveying crop particles, said fluidic lift comprising a cylindrical tube having an open entry end and an open exit end, a plenum surrounding said entry end which receives compressed air, a re-entrant lip inside said tube at said entry end, said lip including a flange spaced from the inner wall of said tube and directed away from said entry end, said lip forming a channel which receives compressed air from said plenum, whereby to direct a cylindrical stream of air into the tubing tending to draw crop particles into said tube and to propel and convey them toward said exit end.

11. The method of reducing water content in freshly harvested crop particles in a treatment chamber having spaced apart walls with an air inlet port and an exit port, said ports being spaced apart, there being a path for flow of crop particles from inlet port to exit port, a heated air inlet port and an outlet port for supplying a stream of heated air to said heated air inlet port, a magnetron so disposed and arranged as to emit microwave energy into said crop particles as they pass through the treatment chamber, said method comprising:

continuously supplying a stream of crop particles to said treatment chamber inlet port and removing particles through said exit port which have passed through said treatment chamber, simultaneously injecting a heated air stream into the treatment chamber while exhausting the air stream through the air outlet port, and also simultaneously emitting microwave energy into the crop particles, thereby heating said crop particles and exhausting from said treatment chamber water which has been vaporized by the heated air and by the microwave energy.

12. The method of claim 11 in which the crop particles are pre-heated before being placed in said treatment chamber.

13. The method of claim 12 in which the pre-heating is accomplished by a heated air stream which propels the crop particles through a fluidic lift.

14. The method according to claim 11 in which said crop particles are received from a harvester head while it is harvesting a crop.

15. The method according to claim 11 in which the magnetron emits microwave energy in either one or both of 900 MHZ and 2.45 GHZ.

16. The method according to claim 11 in which the crop particles are left at rest after exiting the treatment chamber to enable moisture to migrate which was not carried away the air stream.

17. The method according to claim 11 in which the airstream is heated by waste heat from a combustion engine.

* * * * *